United States Patent
Saleh et al.

(10) Patent No.: US 10,321,373 B1
(45) Date of Patent: Jun. 11, 2019

(54) CONTROL OF HANDOVER BASED ON PAST DURATION OF CONTROL-PLANE SIGNALING

(71) Applicant: Sprint Spectrum L.P., Overland Park, KS (US)

(72) Inventors: Ahmad N. Saleh, Rochester Hills, MI (US); Deveshkumar N. Rai, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 97 days.

(21) Appl. No.: 15/223,197

(22) Filed: Jul. 29, 2016

(51) Int. Cl.
    *H04W 36/08* (2009.01)
    *H04W 36/24* (2009.01)
    *H04W 36/00* (2009.01)

(52) U.S. Cl.
    CPC ....... *H04W 36/08* (2013.01); *H04W 36/0016* (2013.01); *H04W 36/0072* (2013.01); *H04W 36/245* (2013.01)

(58) Field of Classification Search
    CPC .......... H04L 2012/5608; H04W 84/12; H04W 88/08; H04W 80/04; H04W 88/06; H04W 84/18; H04W 74/08; H04W 80/00
    USPC ............. 370/310.2, 328, 338, 331, 332, 349
    See application file for complete search history.

(56) References Cited

U.S. PATENT DOCUMENTS

| | | | | |
|---|---|---|---|---|
| 5,754,958 A * | 5/1998 | Tsuji | ..................... | H04W 48/06 455/436 |
| 8,200,224 B2 * | 6/2012 | Grob-Lipski | ..... | H04W 36/0088 370/216 |
| 8,243,679 B1 * | 8/2012 | Huang | .................. | H04W 36/30 370/331 |
| 8,989,741 B2 * | 3/2015 | Tamaki | ............. | H04W 36/0011 455/436 |
| 9,032,068 B2 | 5/2015 | Chakrabarti et al. | | |
| 9,226,130 B2 * | 12/2015 | Nylander | ................ | H04W 8/08 |
| 9,363,713 B1 * | 6/2016 | Oroskar | ............ | H04W 36/0083 |
| 9,661,547 B1 * | 5/2017 | Shah | ....................... | H04W 36/30 |
| 2002/0042273 A1 * | 4/2002 | Sasaki | .................... | H04W 36/18 455/442 |
| 2009/0131056 A1 * | 5/2009 | Bontu | ............... | H04W 36/0072 455/436 |

OTHER PUBLICATIONS

Rad, "TWAMP Explained—Measuring Performance in IP Networks," Sep. 2014.

\* cited by examiner

*Primary Examiner* — Brenda H Pham

(57) ABSTRACT

Disclosed is a method and system for selecting a target base station for handover of a wireless communication device, where the selecting is based at least in part on a consideration of the target base station's typical control-plane signaling latency in a core network, and particularly based on a comparison of control-plane signaling duration of multiple candidate target base stations. For instance, where all of the base stations are configured to engage in a particular control-plane signaling transaction from time to time, at issue could be which of the candidate target base stations typically engages in that control-plane signaling transaction the quickest.

17 Claims, 5 Drawing Sheets

CONTROL OF HANDOVER BASED ON PAST DURATION OF CONTROL-PLANE SIGNALING

BACKGROUND

A typical wireless communication system includes a number of base stations each radiating to provide coverage in which to serve wireless communication devices (WCDs) such as cell phones, tablet computers, tracking devices, embedded wireless modules, and other wirelessly equipped devices, whether or not user operated. In turn, each base station may sit as a node on a core access network that includes entities such as a network controller and a gateway system that provides connectivity with an external transport network such as the Internet. With this arrangement, a WCD within coverage of the system may engage in air interface communication with a base station and may thereby communicate via the base station with various remote network entities or with other WCDs served by the base station.

Such a system may operate in accordance with a particular radio access protocol, examples of which include, without limitation, Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1xRTT and 1xEV-DO), Global System for Mobile Communications (GSM), IEEE 802.11 (WIFI), BLUETOOTH, and others. Each protocol may define its own procedures for registration of WCDs, initiation of communications, handover between base station coverage areas, and other functions.

Further, each base station may provide wireless service to WCDs on one or more carrier frequencies, with the air interface defining various downlink and uplink channels. For instance, on the downlink, the air interface may define a reference channel for carrying a reference signal that WCDs can measure to evaluate base station coverage strength, the air interface may define various other downlink control channels for carrying control signaling to WCDs, and the air interface may define one or more downlink traffic channels for carrying bearer data and other information to WCDs. And on the uplink, the air interface may define an access channel for carrying WCD access requests to the base station, the air interface may define one or more other uplink control channels for carrying control signaling to the base station, and the air interface may define one or more uplink traffic channels for carrying bearer data and other information to the base station.

When a WCD initially enters into coverage of such a system, the WCD may scan for a strongest base station coverage area in which to operate, and the WCD may then engage in signaling with and via the base station, to register for service. The WCD may then be served by the base station in a connected state in which the WCD has an established radio-link-layer connection with the base station and the WCD and base station may exchange bearer data (e.g., application-layer communications) over that connection, facilitating communication by the WCD on the external transport network for instance.

When so served, the WCD may also regularly monitor coverage strength from its serving base station and from adjacent base stations, to help ensure that the WCD is served with sufficiently strong coverage and perhaps with the strongest available coverage. If the WCD's coverage from its serving base station becomes threshold weak and if another base station's coverage becomes threshold strong (e.g., threshold stronger than the serving base station's coverage), the WCD may engage in signaling with its serving base station, and the serving base station may take action to coordinate handover of the WCD to the other base station.

Overview

In some instances, there may be multiple candidate target base stations for handover of a WCD. For example, when the WCD detects that coverage from its serving base station is threshold weak, the WCD may detect that coverage from multiple other base stations is threshold strong and thus that the WCD could theoretically hand over to be served any of those other base stations. In such instances, at issue is which base station to select as a handover target for the WCD.

The present disclosure provides for selecting a target base station based at least in part on a consideration of the target base station's typical control-plane signaling latency in the core network, and particularly based on a comparison of control-plane signaling duration of multiple candidate target base stations. In a representative implementation, for instance, where all of the base stations are configured to engage in a particular control-plane signaling transaction from time to time, at issue could be which of the candidate target base stations typically engages in that control-plane signaling transaction the quickest.

A representative control-plane signaling transaction for this purpose could be a send-and-receive process, where the base station sends a control-plane request or other control-plane signal to another core-network entity and, after a period of time, the base station receives a control-plane response or other resulting control-plane signal perhaps from that same other core-network entity. In any given instance of that control-plane signaling transaction, at issue could then be how much time passes from when the base station sent the control-plane request (or other signal) to when the base station receives the control-plane response (or other signal). Or at issue could be how much time passes between similar send-and-receive control-plane signaling by the base station.

In accordance with the disclosure, a determination that a candidate target base station tends to engage in the control-plane signaling transaction the quickest (by comparison with each other candidate target base station) could reasonably support a conclusion that the candidate target base station has the lowest control-plane signaling latency, at least with respect to signaling with one or more particular core-network entities or types of core-network entities. Consequently, it could be beneficial to select that candidate target base station as a handover target for the WCD, to help minimize core-network control-plane signaling latency when serving the WCD.

Accordingly, in one respect, disclosed is a method for controlling handover of a WCD served by a source base station. In accordance with the disclosure, the method could include selecting a target base station to which to hand over the WCD, with the selecting of the target base station being based on a determination that, among a plurality of candidate target base stations that are configured to engage in a particular control-plane signaling transaction on a core access network, the selected target base station has a lowest historical duration per instance of engaging in the particular control-plane signaling transaction on the core access network. Further, the method could then include invoking handover of the WCD to the selected target base station.

In another respect, the disclosed method could include identifying a plurality of candidate target base stations for the WCD, where each candidate target base station provides air interface coverage in which to serve WCDs and is configured to engage in a control-plane signaling transaction on a core access network. Further, the method could include, respectively for each identified candidate target base station, determining, based on past instances of the candidate target base station engaging in the control-plane signaling transaction on the core access network, a representative duration per instance of the candidate target base station engaging in the control-plane signaling transaction. And the method could include selecting one of the identified candidate target base stations as a target base station for handover of the WCD, where the selecting is based on the selected candidate target base station having, among the plurality of candidate target base stations, a lowest determined representative duration per instance of the candidate target base station engaging in control-plane signaling transaction. The method could then include invoking handover of the WCD from the source base station to the target base station.

Still further, disclosed is a base station configured to control handover of a WCD. As disclosed, the base station includes an antenna structure for engaging in air interface communication with WCDs, a backhaul communication interface for engaging in backhaul communication on a core access network. and a controller configured to control handover of a WCD served by the base station. In particular, the controller could be configured to (i) select a target base station to which to hand over the WCD, where selecting of the target base station is based on the controller determining that, among a plurality of candidate target base stations that are configured to engage in a particular control-plane signaling transaction on the core access network, the selected target base station has a lowest historical duration per instance of engaging in the particular control-plane signaling transaction on the core access network, and (ii) invoke handover of the WCD to the selected target base station.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present disclosure will focus on application in the context of LTE as an example radio access protocol and associated network arrangement. However, it will be understood that principles of the disclosure can extend to apply in other scenarios as well, such as with respect to other radio access protocols. Further, even within the context of LTE, variations from the details disclosed may be possible. For instance, elements, arrangements, and functions may be added, removed, combined, distributed, or otherwise modified. In addition, it will be understood that functions described here as being performed by one or more entities may be implemented in various ways, such as by a processing unit executing software instructions for instance.

Figure 1:
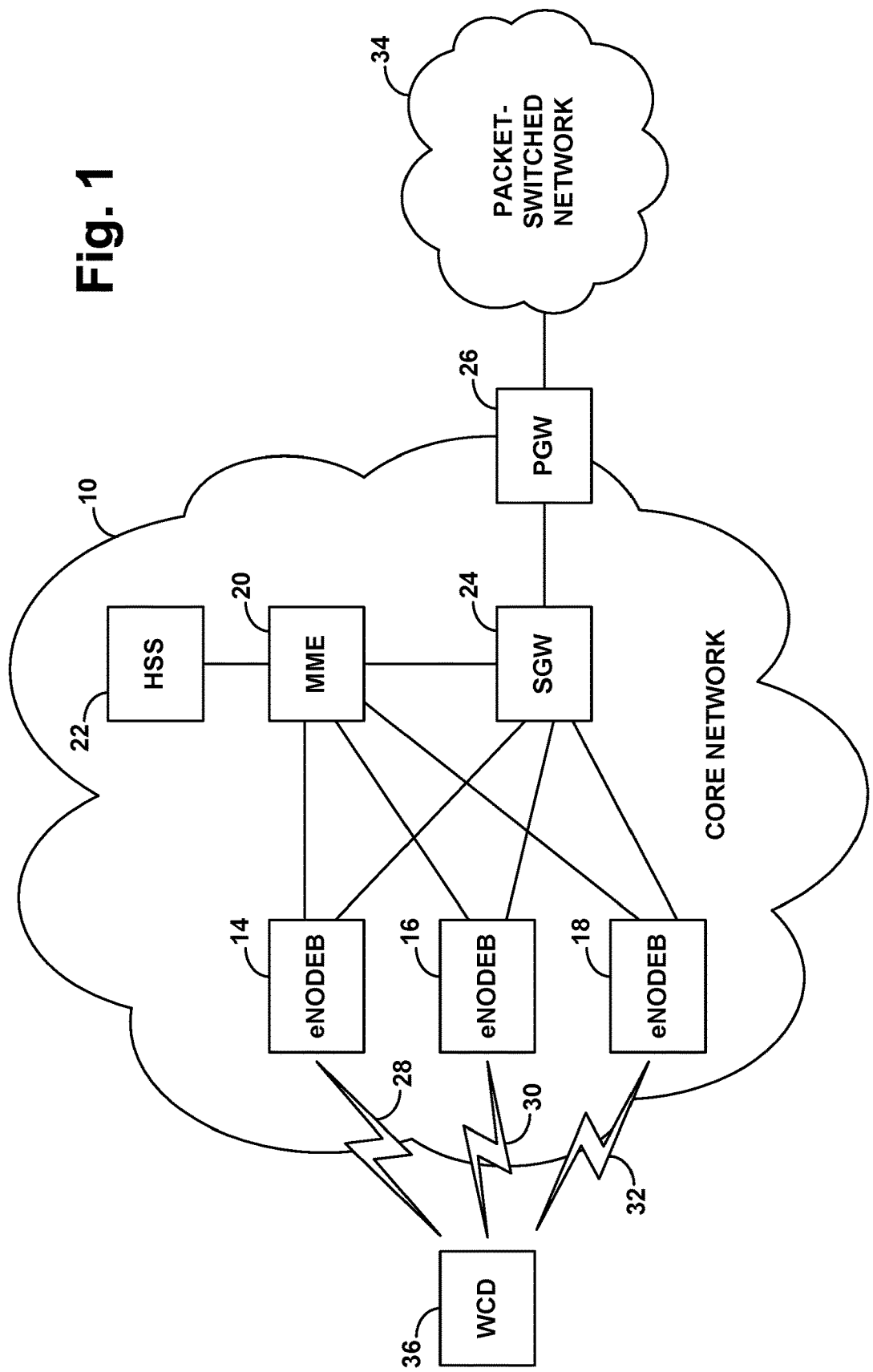
FIG. 1 is a simplified block diagram of an example wireless communication system in which features of the present disclosure can be implemented.

Referring to the drawings, as noted above, FIG. 1 is a simplified block diagram of a wireless communication system in which features of the present disclosure can be implemented. In particular, FIG. 1 depicts a representative LTE core network 10, which functions primarily to serve WCDs with wireless packet data communication service, including possibly voice-over-packet service, but may also provide other functions. The core network 10 (or "evolved packet core (EPC)") could be a packet-switched network, compliant with the industry standard system architecture evolution (SAE) for the LTE protocol, and thus the entities shown on the core network could each have an IP address and be configured to communicate with each other over packet-based tunnels or other communication interfaces, some of which could be dynamically configured as needed to serve individual WCD for instance.

As shown, network 10 includes by way of example several LTE base stations (evolved Node-Bs (eNodeBs)) 14, 16 18, a mobility management entity (MME) 20, a home subscriber server (HSS) 22, a serving gateway (SGW) 24, and a packet data network (PDN) gateway (PGW) 26, with example communication interfaces allowing for communication between various ones of these entities.

Each of the eNodeBs 14, 16, 18 is configured to provide a respective coverage area 28, 30, 32, such as a respective cell or sector, in which the eNodeB can serve WCDs. As such, each eNodeB could take various forms. For instance, an eNodeB could be a macro eNodeB of the type typically including a tower-mounted antenna structure and providing a broad of coverage. Or an eNodeB could be a small-cell eNodeB or the like (e.g., a femtocell, relay, etc.) of the type typically having a smaller form factor and providing a narrower range of coverage. Each eNodeB could then have a communication interface (e.g., an S1-MME interface) with the MME 20 and could be configured to engage in signaling (e.g., S1AP signaling) with the MME over that interface. Further, each eNodeB could have a communication interface (e.g., an S1-U interface) with the SGW 24 and could be configured to engage in communication of bearer data (e.g., GTP-U communication) over that interface.

The MME 20 then operates as a signaling controller in the core network 10, facilitating operations such as WCD authentication, tracking area registrations, paging, and handover, and coordinating setup of bearer tunnels for carrying WCD data communications between the eNodeBs and the SGW 24 (and in turn between the SGW 24 and the PGW 26). As such, the MME could have the above-noted communication interface (e.g., S1-MME interface) with each eNodeB and could be configured to engage in signaling (e.g., e.g., S1AP signaling) with the eNodeBs over that interface, and the MME could also have an interface (e.g., an S11 interface) with the SGW and could be configured to engage in signaling (e.g., GTP control signaling) with the SGW over that interface. Further, the MME could have an interface (e.g., an S6a interface) with the HSS 22 and could be configured to engage in signaling (e.g., Diameter signaling) with the HSS over that interface.

The SGW 24 in turn operates as a local gateway supporting bearer data communication between the eNodeBs and the PGW, and could be configured to work with the MME to facilitate setup and control of bearers for WCDs. As such, the SGW could have the above-noted interface (e.g., S11 interface) with the MME and could be configured to engage in signaling (e.g., GTP control signaling) with the MME over that interface, the SGW could further have the above-noted interface (e.g., S1-U interface) interface with each eNodeB and could be configured to engage in communication of bearer data (e.g., GTP-U communication) with the eNodeBs over those interfaces. Further, the SGW could have an interface (e.g., an S5 interface) with the PGW 26 and could be configured to engage in signaling (e.g., GTP control signaling) with the PGW over that interface and additionally to engage in communication of bearer data (e.g., GTP-U communication) with the PGW over that interface.

The PGW 26 then operates to provide connectivity with an external packet-switched network 34, and/or with other packet-switched transport networks, to enable served WCDs to engage in packet-switched communication with various communication servers, remote client devices, and/or other entities. As such, the PGW could have above-noted interface (e.g., S5 interface) with the SGW 24 and could be configured to engage in signaling (e.g., GTP control signaling) with the SGW over that interface and further to engage in communication of bearer data (e.g., GTP-U communication) with the SGW over that interface.

Numerous variations from this example network arrangement are possible. By way of example, while all of the eNodeBs are shown interfaced with a common MME and a common SGW, various ones of the eNodeBs could be interfaced with different MMES and with different SGWs. In practice, for instance, each region of the wireless communication system could have its own MME or group of MMEs, and the illustrated eNodeBs could be located in different regions than each other, such as with one eNodeB at the border of one region and another eNodeB at the adjacent border of another region. As another example, while the PGW is shown providing connectivity with an external packet-switched network, the PGW could instead or additionally provide connectivity to within the core network itself. Such internal core-network connectivity could be useful in a scenario where any of the eNodeBs operates as a donor eNodeB providing coverage for a relay base station, as the PGW could then enable that relay base station to engage in the above-noted communication with other core network entities.

As still another example, the network could include other interfaces between the illustrated entities. For example, the eNodeBs have interfaces (e.g., X2 interfaces) with each other, and the eNodeBs could be configured to engage in signaling (e.g., X2AP signaling) with each other over those interface as well as to engage in communication of bearer data (e.g., GTP-U communication) with each other over those interfaces. Other examples are possible as well.

In a network such as this, the illustrated eNodeBs could thus be configured to engage in various types of communication with other entities on the core network. Such communication could be generally categorized into "control-plane signaling" and "user-plane communication". The control-plane signaling encompasses any of the eNodeB's control signaling with other core network entities to help manage operations in the wireless network and service of WCDs, and could thus include communications such as bearer setup signaling, tracking area update signaling, paging, handover signaling, the like (including, without limitation, the above-noted S1AP signaling and the above-noted X2AP signaling). Whereas, the user-plane communication encompasses bearer data being communicated to or from one or more WCDs served by the eNodeB, such as packet data that the eNodeB receives from an SGW and then schedules/transmits to a WCD and packet data that the eNodeB receives from a WCD and forwards to an SGW for transmission to the PGW and onto a packet-switched transport network (including, without limitation, the above-noted GTP-U communication).

As noted above, the present disclosure provides for selecting a base station as a handover target for a WCD based on consideration of how quick the base station's control-plane signaling tends to be. FIG. 1 depicts a representative WCD 36 that could be the subject of this process. As shown in FIG. 1, WCD 36 is within coverage of all three example eNodeBs.

We can assume that WCD 36 is currently served by eNodeB 16 but that the WCD's coverage from eNodeB 16 is becoming weak, and that the WCD is detecting sufficiently strong coverage respectively from each of eNodeBs 14, 18. Pursuant to measurement-event thresholds specified by eNodeB 16, for instance, WCD 36 may then transmit a measurement report via an uplink air interface signaling channel to eNodeB 16, specifying in the measurement report the low signal strength from eNodeB 16 and the high signal strengths from each of the other eNodeBs. And eNodeB 16 may conclude based on those signal strength reports that both of those other eNodeBs are legitimate candidates to be handover targets for the WCD. At issue in that situation is then which of the other eNodeBs should be selected as the handover target for handover of the WCD.

As noted above, the selection of a handover target from among two or more such candidates could be based on how long it has historically taken each candidate to engage in a particular control-plane signaling transaction. Here, the assumption is that each candidate target eNodeB is configured to engage in the particular control-plane signaling transaction, and the question could then be which candidate's historical experience engaging in that particular control-plane signaling transaction has tended to be the quickest.

Figure 2:
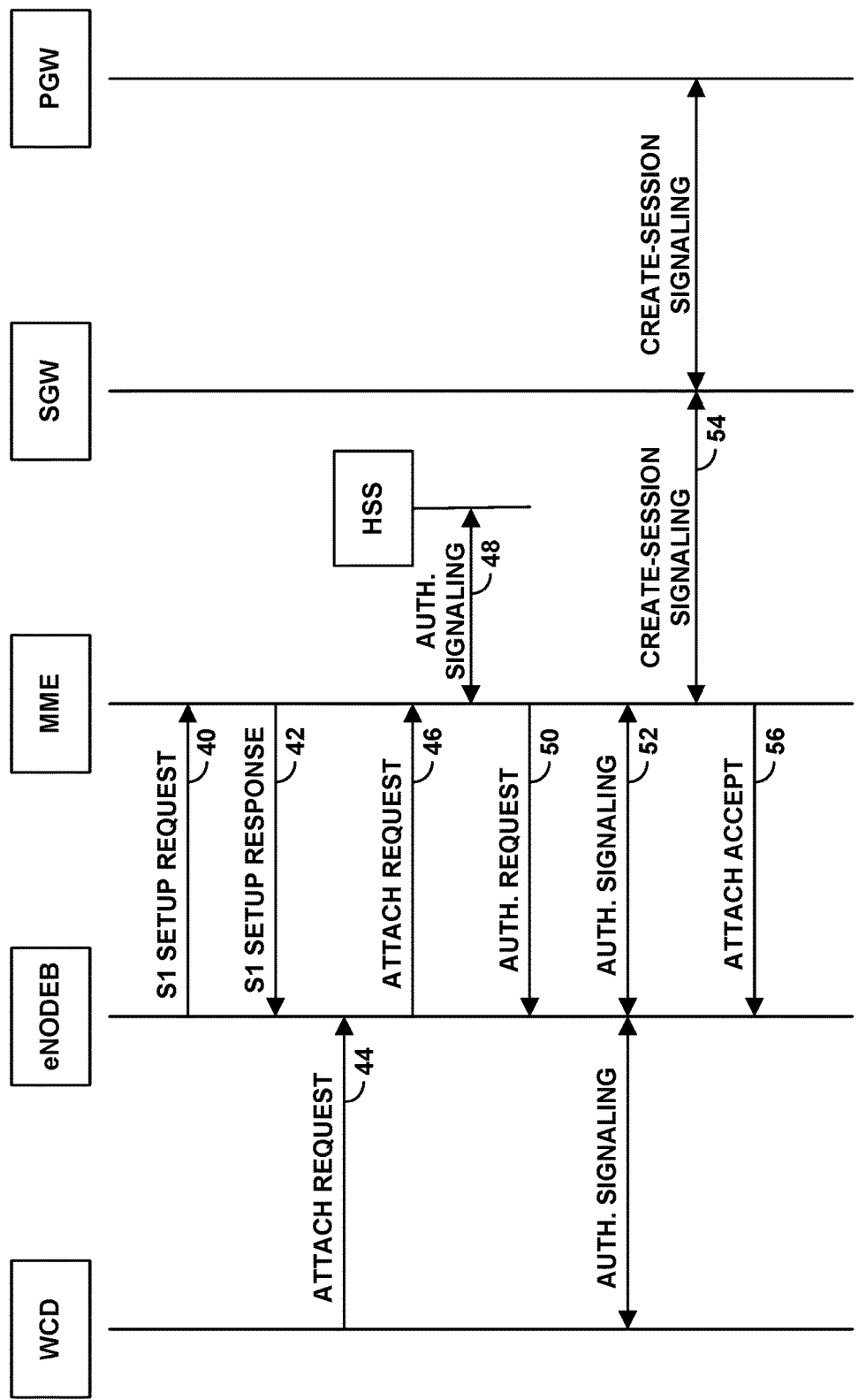
FIG. 2 is a message flow diagram depicting various example control-plane signaling transactions.

Any of a variety of control-plane signaling transactions could be used as the subject of this analysis. Optimally, the control-plane signaling transaction would be a standard one (such that all of the eNodeBs would from time to time engage in the transaction) and would be one that helps demonstrate representative latency of core network control-plane signaling to and/or from the eNodeB. Without limitation, an example control-plane signaling transaction could relate to the attach process that occurs when a WCD enters into coverage of the system (or moves between certain regions in the system). FIG. 2 is a message flow diagram depicting an example of such an attach process.

The process steps shown in FIG. 2 begin with an eNodeB engaging in signaling with an MME to set up an S1-MME interface through which the eNodeB and MME can engage in further control-signaling with each other. This process may involve the eNodeB transmitting an S1 setup request to the MME, at step 40, and the MME responsively transmitting an S1 setup response (e.g., setup successful) to the eNodeB, at step 42, among other possible messages, to set up a transport network layer (TNL) under the Stream Control Transmission Protocol (SCTP).

In turn, after some radio-link-layer signaling between the eNodeB and a WCD seeking to attach, the eNodeB receives from the WCD an attach request (e.g., a message encapsulating the attach request), at step 44. At step 46, the eNodeB then transmits that attach request in an S1AP control signal to the MME for processing. This then triggers an authentication process, including certain authentication signaling between the MME and the HSS at step 48 and, in turn, an authentication request sent in an S1AP message from the HSS to the MME at step 50. After additional authentication signaling at step 52 between the eNodeB and the WCD and between the eNodeB and the MME, the MME, SGW, and PGW then engage create-session signaling (GTP control signaling) at step 54 to establish bearer tunnels for carrying user-plane data. And at step 56, the eNodeB then receives from the MME in an S1AP control signal an attach accept message (e.g., a message encapsulating the attach accept), which triggers further signaling to complete setup of further bearer tunnels for the WCD.

This message flow illustrates several control-plane signaling transactions that could be used as a basis for evaluating control-plane signaling latency in accordance with present disclosure.

One example is the overall attach signaling process ranging from when the eNodeB sends the attach request message to the MME at step 46 (or perhaps when the eNodeB receives the attach request message from the WCD at step 44) to when the eNodeB receives a responsive attach accept message from the MME (or perhaps when the eNodeB engages in further signaling in response to the attach accept message). Each eNodeB may engage in this particular control-plane signaling transaction from time to time, albeit possibly with a different MME, and each time the signaling transaction may typically include generally the same messages (albeit with different contents). For instance, between sending the attach request at step 46 and receiving the attach accept at step 56, this particular transaction may typically include the other signaling of steps 48-54, which may be of fairly constant duration. However, for various reasons, there may be more variable timing of S1AP signaling between each eNodeB and the MME, possibly due to the MME being closer to or farther from the eNodeB for instance, and/or possibly due to core network congestion or, if the eNodeB is a relay, because signaling to and from the eNodeB needs to traverse a scheduled air interface and a core network gateway. Thus, it may take longer for some eNodeBs to engage in this control-plane signaling transaction than for other eNodeBs to do so.

Another example of an applicable control-plane signaling transaction is the signaling process from when the eNodeB sends the attach request to the MME at step 46 to when the eNodeB receives the authentication request from the MME in turn at step 50. Here, there is even less intervening signaling between those two control signals, and so a measurement of duration between the signals could be even more representative of level of control-plane signaling latency between the eNodeB and the MME. And again, various eNodeBs may experience longer durations of this control-plane signaling transaction than other eNodeBs experience.

Other examples of control-plane signaling transactions could be applied as well, whether or not limited to signaling between the eNodeB and the MME and whether not related to the attach process. As another example shown in FIG. 2, for instance, an applicable control-plane signaling transaction could be the signaling process from when the eNodeB sends an S1 setup request to the MME at step 40 to when the eNodeB receives an S1 setup response from the MME at step 42. Further, other examples could take into account X2AP signaling with other eNodeBs and/or control-plane signaling with still other core network entities.

In accordance with the present disclosure, each eNodeB in the system could be configured to keep track of how long the particular control-plane signaling transaction takes when the eNodeB engages in the transaction, possibly specifically for particular times of day or the like. For each instance of occurrence of the control-plane signaling transaction, for example, the eNodeB could record a timestamp of the start of the control-plane signaling transaction and could then determine a duration of the control-plane signaling transaction at the end of the transaction by comparing current time with the start timestamp.

Further, each eNodeB could be configured to establish a representative measure of duration per instance of the eNodeB's engaging in the control-plane signaling transaction, such as an average or other statistically rolled up value or code indicating the historical duration per instance of the eNodeB engaging in the control-plane signaling transaction, possibly separate such measures per time of day (e.g., for busy hours versus light hours). And the eNodeBs could be configured to share their representative measures with each other, though periodic or other X2AP signaling with each other for instance. Alternatively, the eNodeBs could be configured to report their representative measures to each other upon request (e.g., upon query from a source eNodeB seeking to decide which candidate target eNodeB to select for WCD handover).

With this information, when an eNodeB (such as eNodeB 16 in FIG. 2) is faced with the question of which of various candidate target eNodeBs (such as eNodeBs 14 and 18 in FIG. 20 to select as a handover target for a WCD, the eNodeB could make the decision based at least in part on which of the candidate target eNodeBs has the shortest typical duration per instance of the particular control-plane signaling transaction. For instance, the eNodeB could refer to records previously received from the candidate eNodeBs indicating their typical duration per instance of the control-plane signaling transaction, or the eNodeB could request and receive such information from each candidate eNodeB, possibly focusing specifically on such measures for the current time of day (and thus filtering other data out of the analysis).

By comparing the representative measures of duration per instance of the various candidate target eNodeBs, the eNodeB could thereby determine which candidate has the shortest typical duration of the control-plane signaling transaction and could therefore select that candidate as the handover target for the WCD. Further, the eNodeB could take into account other factors as well, such as candidate eNodeB load and WCD reported signal strength for instance.

Once an eNodeB thereby selects a candidate eNodeB as a handover target for the WCD, the eNodeB could then invoke handover of the WCD to the selected handover target. For instance, the eNodeB could engage in X2AP signaling with the handover target to prepare the handover target to serve the WCD, and the eNodeB could then send a handover direction message over the air to the WCD, directing and thus causing the WCD to transition from being served by the eNodeB to instead being served by the target.

Figure 3:
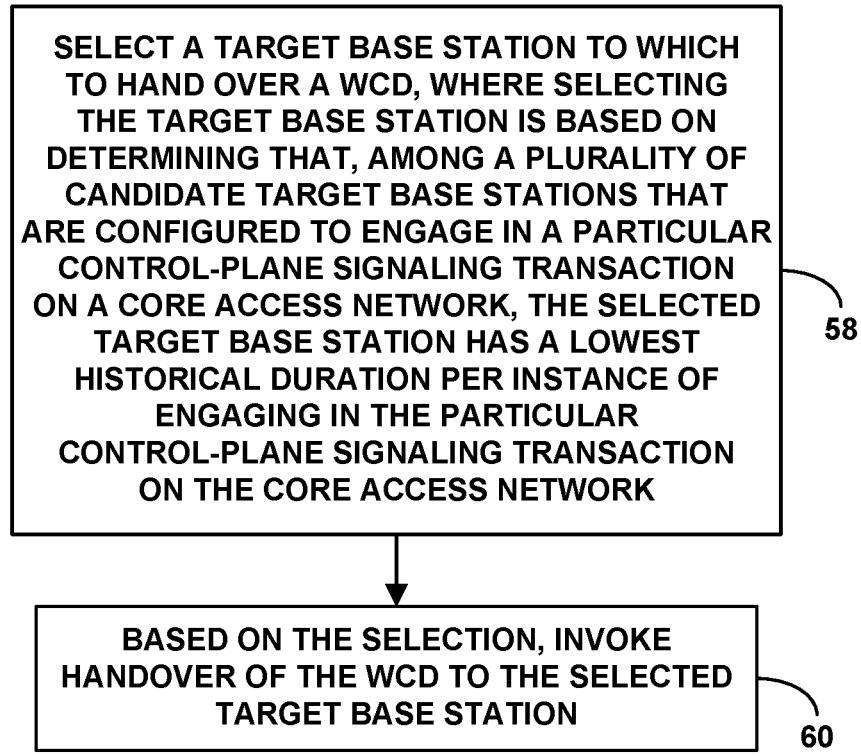
FIG. 3 is a flow chart depicting operations that can be carried out in accordance with the disclosure.

FIG. 3 is next a flow chart depicting a method that can thus be carried out in accordance with the present disclosure, to control handover of a WCD served by a source base station. As shown in FIG. 3, at block 58, the method includes selecting a target base station to which to hand over the WCD, where selecting the target base station is based on determining that, among a plurality of candidate target base stations that are configured to engage in a particular control-plane signaling transaction on a core access network, the selected target base station has a lowest historical duration per instance of engaging in the particular control-plane signaling transaction on the core access network. And at block 60, the method includes, based on the selecting (in accordance with the selection), invoking handover of the WCD to the selected target base station.

In line with the discussion above, for instance, the selecting of the target base station based on evaluation of the historical duration per instance of engaging in the particular control-plane signaling duration could involve receiving from each candidate target base station a report of the candidate target base station's historical duration per instance of engaging in the particular control-plane transaction, and comparing the received historical durations, to determine which candidate target base station has the lowest representative duration.

Further, in line with the discussion above, the particular control-plane signaling transaction could take various forms, examples of which include (i) an attach process, with the historical duration of the attach process being a duration from an attach-request message to an attach-accept message, and (ii) control-plane signaling ranging from transmitting an attach request to receiving an authentication request, with the historical duration being a duration from transmitting the attach request to receiving the authentication request, allowing for reasonable variations. And as discussed above, the historical duration per instance of engaging in the particular control-plane transaction could be or include an average of durations of past instances of engaging in the particular control-plane signaling transaction.

Figure 4:
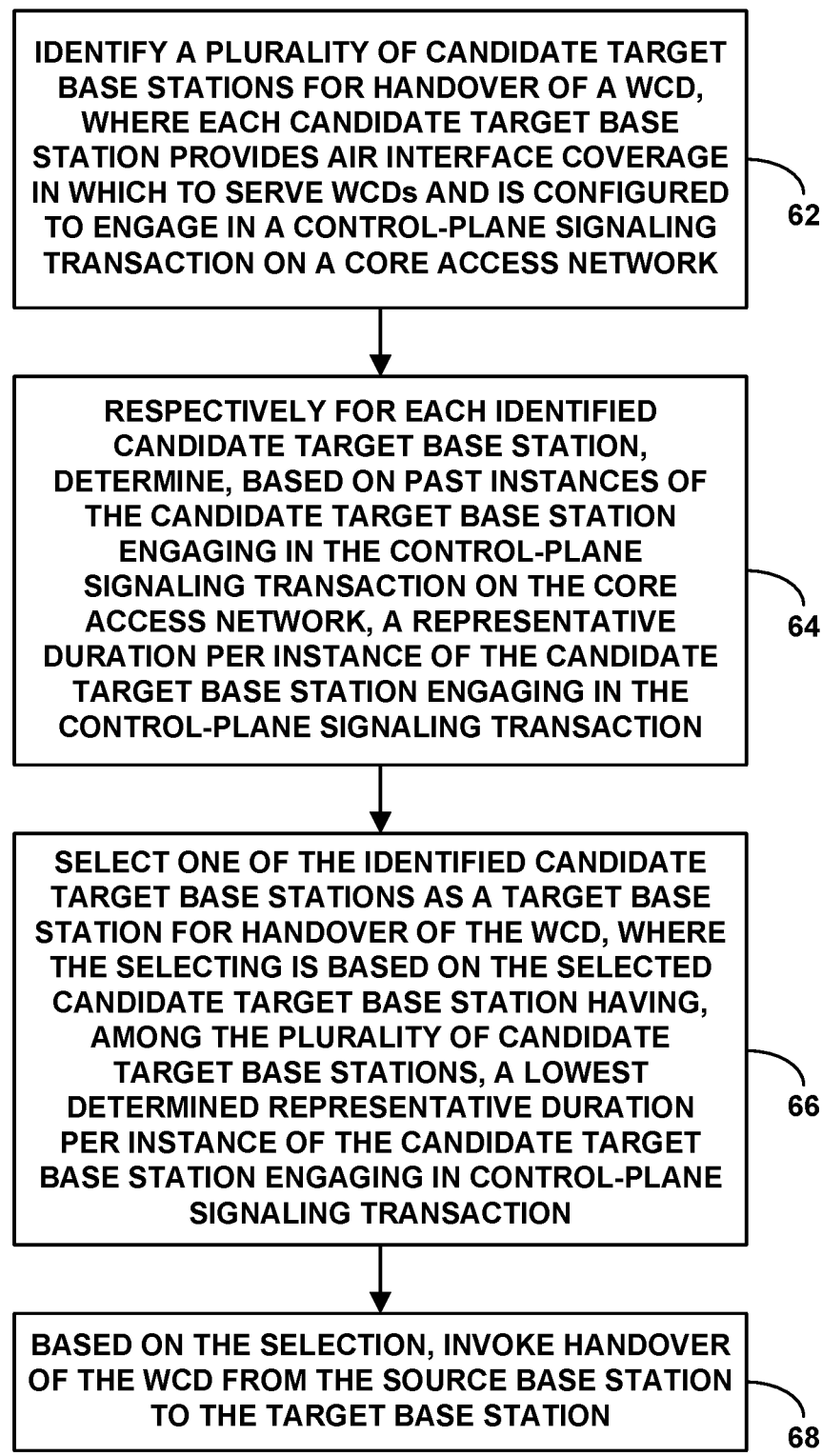
FIG. 4 is another flow chart depicting operations that can be carried out in accordance with the disclosure.

FIG. 4 is next another flow chart depicting a method that can be carried out in accordance with the present disclosure, to control handover of a WCD served by a source base station. As shown in FIG. 4, at block 62, the method includes identifying a plurality of candidate target base stations for the WCD, where each candidate target base station provides air interface coverage in which to serve WCDs and is configured to engage in a control-plane signaling transaction on a core access network. And at block 64, the method includes, respectively for each identified candidate target base station, determining, based on past instances of the candidate target base station engaging in the control-plane signaling transaction on the core access network, a representative duration per instance of the candidate target base station engaging in the control-plane signaling transaction.

At block 66, the method then includes selecting one of the identified candidate target base stations as a target base station for handover of the WCD, where the selecting is based on the selected candidate target base station having, among the plurality of candidate target base stations, a lowest determined representative duration per instance of the candidate target base station engaging in control-plane signaling transaction. And at block 68, the method includes, based on the selection, invoking handover of the WCD from the source base station to the target base station.

In line with the discussion above, the act of identifying the plurality of candidate target base stations for the WCD could involve determining that the WCD is within threshold strong coverage of each candidate target base station of the plurality. For instance, this could be done based on one or more measurement reports received from the WCD, indicating signal strength (e.g., downlink signal strength and/or signal-to-noise ratio) from each such candidate target base station.

Further, the act of determining respectively for each identified candidate target base station the representative duration per instance of the identified candidate target base station engaging in control-plane signaling transaction could involve receiving from the identified candidate target base station (possibly before it is identified as a target) a report of the representative duration per instance of the candidate target base station engaging in the control-plane signaling transaction. And still further, the example control-plane signaling transactions could apply here as well, and the representative duration respectively for each identified candidate target base station could be or include an average of durations of the past instances of the identified candidate target base station engaging in the control-plane signaling transaction.

Still further, in line with the discussion above, the act of selecting one of the identified candidate target base stations as the target base station for handover of the WCD based on the selected candidate target base station having, among the plurality of candidate target base stations, a lowest determined representative duration of the control-plane signaling transaction could involve (i) comparing the determined representative durations of the identified candidate target base stations, to determine which of the identified candidate target base stations has the lowest determined representative duration, and (ii) selecting the determined candidate target base station as the target base station for handover of the WCD. And the act of invoking the handover could involve (i) engaging signaling with the target base station to prepare the handover and (ii) directing the WCD to hand over to the target base station.

Figure 5:
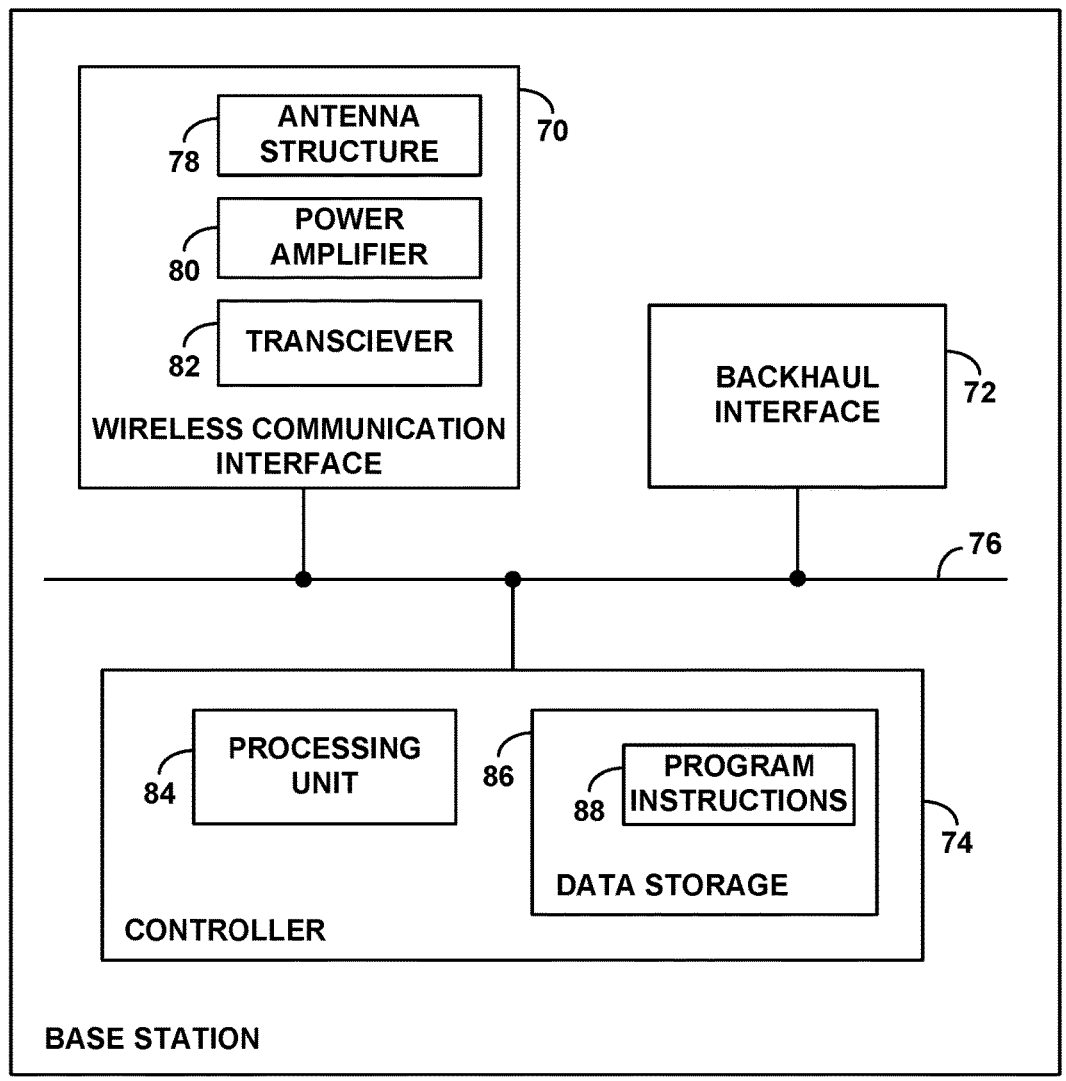
FIG. 5 is a simplified block diagram of a base station operable in the disclosed system.

Finally, FIG. 5 is a simplified block diagram of an example base station, showing some of the components that each of the base stations in FIG. 1 could include in an example implementation. As shown in FIG. 5, the base station includes a wireless communication interface 70, a backhaul interface 72, and a controller 74. These components are shown communicatively linked together by a system bus or other communication link 76, but it will be understood that the components could alternatively be integrated together or distributed in various ways. For instance, aspects of the controller 74 could be provided in a chipset that implements functions of the wireless communication interface 70. Other examples are possible as well.

As shown, wireless communication interface 70 could include an antenna structure 78, which, together with a power amplifier 80 and a transceiver 82, facilitates air interface communication with one or more served WCDs. Backhaul interface 72 could then include a wired or wireless network interface, such as an Ethernet interface, through which the base station could communicate with other entities of the core network, such as with a signaling controller (e.g., MME) and with other base stations.

And controller 74 could include a processing unit (one or more processors) 84, non-transitory data storage 86, and program instructions 88 stored in the non-transitory data storage and executable by the processing unit to carry out various operations described herein. For instance, the controller could be thus configured to cause the base station to carry out the particular control-plane signaling transaction that would be the subject of the present target-selection and handover control process. Further, the controller could be thus configured to (i) select a target base station to which to hand over a WCD, with the selecting of the target base station being based on the controller determining that, among a plurality of candidate target base stations that are configured to engage in a particular control-plane signaling transaction on the core access network, the selected target base station has a lowest historical duration per instance of engaging in the particular control-plane signaling transaction on the core access network, and (ii) invoke handover of the WCD to the selected target base station. Other features discussed above can be applied in this context as well, and vice versa.

Exemplary embodiments have been described above. Those skilled in the art will understand, however, that changes and modifications may be made to these embodiments without departing from the true scope and spirit of the invention.

What is claimed is:

1. A method for controlling handover of a wireless communication device (WCD) served by a source base station, the method comprising:

selecting by the source base station a target base station to which to hand over the WCD, wherein selecting the target base station is based on determining that, among a plurality of candidate target base stations that are each configured to engage in a particular control-plane signaling transaction on a core access network, the selected target base station's engaging in the particular control-plane signaling transaction on the core access network has historically been quickest compared with each other candidate target base station's engaging in the particular control-plane signaling transaction on the core access network, wherein determining that the selected target base station's engaging in the particular control-plane signaling transaction on the core access network has historically been quickest compared with each other candidate target base station's engaging in the particular control-plane signaling transaction on the core access network is based on an average of durations of past instances of the selected target base station's engaging in the particular control-plane signaling transaction; and based on the selecting, invoking by the source base station handover of the WCD to the selected target base station.

2. The method of claim 1, wherein selecting the target base station based on determining that the target base station's engaging in the particular control-plane signaling transaction on the core access network has historically been quickest compared with each other candidate target base station's engaging in the particular control-plane signaling transaction on the core access network comprises:

receiving from each candidate target base station a measure of how long it has taken the candidate target base station to engage in the particular control-plane transaction, and comparing the received measures, to determine which candidate target base station's engaging in the particular control-plane signaling transaction on the core access network has historically been quickest compared with each other candidate target base station's engaging in the particular control-plane signaling transaction on the core access network.

3. The method of claim 1, wherein the particular control-plane signaling transaction is an attach process, from an attach-request message to an attach-accept message.

4. The method of claim 1, wherein the particular control-plane signaling transaction is control-plane signaling ranging from transmitting an attach request to receiving an authentication request.

5. The method of claim 1, wherein invoking handover of the WCD to the selected target base station comprises:

engaging in handover signaling with the selected target base station to prepare the handover; and directing the WCD to hand over to the selected target base station.

6. A method for controlling handover of a wireless communication device (WCD) served by a source base station, the method comprising:

identifying a plurality of candidate target base stations for the WCD, wherein each candidate target base station provides air interface coverage in which to serve WCDs and is configured to engage in a control-plane signaling transaction on a core access network;

respectively for each identified candidate target base station, determining by the source base station, based on past instances of the candidate target base station engaging in the control-plane signaling transaction on the core access network, a representative duration of the candidate target base station engaging in the control-plane signaling transaction, wherein the representative duration is based on an average of the past instances of the candidate target base station engaging in the control-plane signaling transaction;

selecting by the source base station one of the identified candidate target base stations as a target base station for handover of the WCD, wherein the selecting is based on the selected candidate target base station having, among the plurality of candidate target base stations, a lowest determined representative duration of the candidate target base station engaging in the control-plane signaling transaction; and invoking by the source base station handover of the WCD from the source base station to the target base station.

7. The method of claim 6, wherein identifying the plurality of candidate target base stations for the WCD comprises determining that the WCD is within threshold strong coverage of each candidate target base station of the plurality.

8. The method of claim 7, wherein determining that the WCD is within threshold strong coverage of each candidate target base station of the plurality is based on one or more measurement reports from the WCD.

9. The method of claim 6, wherein determining respectively for each identified candidate target base station the representative duration of the identified candidate target base station engaging in control-plane signaling transaction comprises receiving from the identified candidate target base station a report of the representative duration of the candidate target base station engaging in the control-plane signaling transaction.

10. The method of claim 6, wherein the control-plane signaling transaction is an attach process, and wherein the representative duration of engaging in the attach process is a duration from an attach-request message to an attach-accept message.

11. The method of claim 6, wherein the control-plane signaling transaction is control-plane signaling ranging from transmitting an attach request to receiving an authentication request.

12. The method of claim 6, wherein selecting one of the identified candidate target base stations as the target base station for handover of the WCD based on the selected candidate target base station having, among the plurality of candidate target base stations, a lowest determined representative duration of engaging in the control-plane signaling transaction comprises:

comparing the determined representative durations of the identified candidate target base stations, to determine which of the identified candidate target base stations has the lowest determined representative duration; and selecting the determined candidate target base station as the target base station for handover of the WCD.

13. The method of claim 6, wherein invoking handover of the WCD from the source base station to the target base station comprises:

engaging in handover signaling with the target base station to prepare the handover; and directing the WCD to hand over to the target base station.

14. A base station comprising:

an antenna structure for engaging in air interface communication with wireless communication devices (WCDs);

a backhaul communication interface for engaging in backhaul communication on a core access network;

a controller configured to control handover of a WCD served by the base station, wherein the controller is configured to (i) select a target base station to which to hand over the WCD, wherein selecting of the target base station is based on the controller determining that, among a plurality of candidate target base stations that are each configured to engage in a particular control-plane signaling transaction on the core access network, the selected target base station's engaging in the particular control-plane signaling transaction on the core access network has historically been quickest compared with each other candidate target base station's engaging in the particular control-plane signaling transaction on the core access network, wherein determining that the selected target base station's engaging in the particular control-plane signaling transaction on the core access network has historically been quickest compared with each other candidate target base station's engaging in the particular control-plane signaling transaction on the core access network is based on an average of durations of past instances of the selected target base station's engaging in the particular control-plane signaling transaction, and (ii) invoke handover of the WCD to the selected target base station.

15. The base station of claim 14, wherein selecting of the target base station based on the controller determining that the target base station's engaging in the particular control-plane signaling transaction on the core access network has historically been quickest compared with each other candidate target base station's engaging in the particular control-plane signaling transaction on the core access network comprises:

receiving via the backhaul communication interface from each candidate target base station a measure of how long it has taken the candidate target base station to engage in the particular control-plane transaction, and comparing the received measures, to determine which candidate target base station's engaging in the particular control-plane signaling transaction on the core access network has historically been quickest compared with each other candidate target base station's engaging in the particular control-plane signaling transaction on the core access network.

16. The base station of claim 14, wherein the particular control-plane signaling transaction is an attach process, from an attach-request message to an attach-accept message.

17. The base station of claim 14, wherein invoking handover of the WCD to the selected target base station comprises:

engaging in handover signaling with the selected target base station to prepare the handover; and directing the WCD to hand over to the selected target base station.

* * * * *